United States Patent [19]
Bussink et al.

[11] Patent Number: 5,852,155
[45] Date of Patent: Dec. 22, 1998

[54] COMPOSITIONS OF POLYESTERAMIDES

[75] Inventors: Jan Bussink, Kapelle, Belgium; Reinoud Jaap Gaymans, Enschede; Johannes Hubertus G. M. Lohmeijer, Hoogerheide, both of Netherlands; Ilias Nicholas Mamalis, Brasschat, Belgium; Gary F. Smith, Evansville, Ind.; Antoinette Cornelia Maria van Bennekom, Enschede, Netherlands

[73] Assignee: General Electric Company, Pittsfield, Mass.

[21] Appl. No.: 397,324

[22] Filed: Mar. 1, 1995

[51] Int. Cl.$^6$ .......................... C08G 69/44; C08G 73/16; C08G 63/16

[52] U.S. Cl. .......................... 528/170; 528/183; 528/208; 528/272; 528/288; 528/290; 528/292; 528/293; 528/332; 528/335; 528/343

[58] Field of Search .................................... 528/170, 183, 528/332, 335, 290, 288, 292, 272, 208, 343, 293

[56] References Cited

U.S. PATENT DOCUMENTS

| | | |
|---|---|---|
| 2,856,385 | 10/1958 | Van Den Berghe et al. . |
| 3,849,514 | 11/1974 | Gray, Jr. et al. . |
| 4,081,428 | 3/1978 | Thompson . |
| 4,116,943 | 9/1978 | Ducarre . |
| 4,129,715 | 12/1978 | Chen et al. . |
| 4,145,372 | 3/1979 | Murray et al. . |
| 4,209,607 | 6/1980 | Shalaby et al. . |
| 4,501,879 | 2/1985 | Barbee et al. . |
| 4,579,914 | 4/1986 | Nelb, II et al. . |
| 4,614,815 | 9/1986 | Cognigni et al. . |
| 4,649,180 | 3/1987 | Chen et al. . |
| 4,868,277 | 9/1989 | Chen . |
| 4,952,629 | 8/1990 | Liang . |
| 5,028,649 | 7/1991 | Efner . |
| 5,091,494 | 2/1992 | Leistner et al. . |
| 5,321,099 | 6/1994 | Goldwasser et al. . |

FOREIGN PATENT DOCUMENTS

| | | |
|---|---|---|
| 0 058 938 A1 | 9/1982 | European Pat. Off. . |
| A2 0 143 953 | 6/1985 | European Pat. Off. . |
| 0 271 914 A2 | 6/1988 | European Pat. Off. . |
| 271 823 A3 | 8/1989 | European Pat. Off. . |
| 0 315 027 A2 | 10/1989 | European Pat. Off. . |
| 0 437 981 A1 | 7/1991 | European Pat. Off. . |
| 0 445 548 B1 | 11/1991 | European Pat. Off. . |
| 0 457 564 A1 | 11/1991 | European Pat. Off. . |
| 0 608 976 A1 | 8/1994 | European Pat. Off. . |
| 2 299 357 | 8/1976 | France . |
| 56-103221 | 8/1981 | Japan . |
| 56-147842 | 11/1981 | Japan . |
| 82-57137321 | 8/1982 | Japan . |
| 57-207643 | 12/1982 | Japan . |
| 57-207644 | 12/1982 | Japan . |
| 57-209954 | 12/1982 | Japan . |
| 60-229919 | 11/1985 | Japan . |
| 61-081453 | 4/1986 | Japan . |
| 3255124 | 11/1991 | Japan . |
| 1365952 | 11/1974 | United Kingdom . |
| 2 012 288 | 7/1979 | United Kingdom . |

OTHER PUBLICATIONS

Chemical Abstract —AN 121:110510 CA.
Gaymans R. J., DeHaan J. L., Van Niewenhuize O., J.Pol.Sco.Chem. 31 575 1993.
Williams J. L. R., Laakso T. M., contois L. E., J.Pol.Sci. 61 353 (1962).
Della Fortuna G., Oberrauch E., Salvatori T., Sorta E., Bruzzone M., Polymer 18 269 (1977).
Delimoy D., Bailly C., Deveaux J., Legras R., Pol.Eng.Sci.& Eng. 28 104 (1988).
Aharoni S. M., Macronolecules 21 1941 (1988).
Yamazaki N., Masumotom., Higashi F., J.Polym.Sci., Polym.Chem.Ed 13 1373 (1975).
De Candia F., Maglio G., Palumbo R., Polym.Bull. 8 109 (1982).
Yamada K., Hashimoto K., Takayanagi M., Murata Y., J.Appl.Polym.Sci. 33 1649 (1987).
Manzini, G., Crescenzi, V., Ciana, A., Ciceri, L., Fortuna, G. Della, and Zotteri, L. European Polymer Journal, 1973, vol. 9, pp. 941–951.

*Primary Examiner*—P. Hampton-Hightower

[57] ABSTRACT

Disclosed are polyesteramide resin compositions having amide units of formula (I):

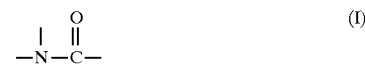

and the units of the formula (II):

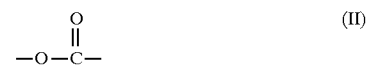

wherein the polyesteramide is substantially devoid of units derived from butane diol. The ratio of (I) to (II) in the polyesteramide is preferably less than 1:3. Preferred polyesteramides have at least 80% of units of formula (I) separated by at least one of the units of formula (II).

5 Claims, No Drawings

COMPOSITIONS OF POLYESTERAMIDES

FIELD OF THE INVENTION

The present invention relates to polyesteramide copolymer resins. The present invention also comprises methods for making polyesteramide copolymer resins as well as useful articles of manufacture molded therefrom.

BACKGROUND OF THE INVENTION

EP-A-0 315 027 describes copolymers of the general formula:

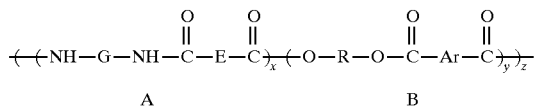

In this formula x, y and z are each integers from 1 to 100,000. G may be the residue of tetramethylenediamine, E may be the residue of terephthalic acid, R may be the residue of 1,4-butanediol, Ar is a divalent aromatic carboxylic group. Units A comprise from about 1 to about 99 percent by weight of said copolymer and units B comprise from about 99 to about 1 percent by weight of said copolymer. Said copolymers can be block copolymers, "alternating" copolymers, or random copolymers. EP-A-0 315 027 also indicates that the block copolymers are useful in automotive applications, electrical appliances, and food wrappings, as stand alone resins, in blends with other resins such as polyesters, polyarylates and polyamides and as tie resins to bond two different resin layers.

DESCRIPTION OF THE PREFERRED EMBODIMENTS

Polyesteramide resins (hereinafter referred to as PEA) are, per se, known in the art PEA refers to polymers comprising units represented by the amide formula (I):

and the ester formula (II):

wherein the polyesteramide is substantially devoid of units derived from 1,4-butanediol.

The PEA of the present invention are substantially aliphatic PEA. Substantially aliphatic PEA refers to PEA containing at least about 10 mol%, preferably at least about 20 mol%, aliphatic residues in the PEA.

In a broad sense, polymers containing all ratios of formula (I) to formula (II) are possible and at the extreme where the amount of formula (II) in the polymers approaches zero, the polymers would be polyamide resins and conversely, where the amount of formula (I) in the polymers approaches zero, the polymers would be known as polyester resins. For the present invention, however, the ratio of units of formula (I) to units of formula (II) are about 1 to 1 or less, preferably about 1 to 2 or less, and most preferably 1 to 3 or less.

The amide formula (I) is generally derived from a reaction between:

(i) compounds having at least one amine group, represented by the general formula (III):

and (ii) compounds having at least one moiety having a carbonyl group, or a moiety capable of forming a carbonyl group, and capable of reacting with the amine of formula (III), and represented by the general formula (IV):

In formula (III), each $R_1$, $R_2$, and $R_3$ can independently be a hydrogen, a $C_{1-20}$ alkylene or $C_{6-20}$ arylene group with the proviso that at least one of $R_1$, $R_2$, or $R_3$ be either a hydrogen or a good leaving group, and with the proviso that at least one of $R_1$, $R_2$, or $R_3$ also contain at least one reactive moiety selected from the group consisting of amine, hydroxyl, carboxylic acid, imido, anhydride, ester, epoxy, carboxylic acid salt, or mixtures of the foregoing. Illustrative examples for formula (III) include:

ammonia,
dimethylenediamine,
trimethylenediamine,
tetramethylenediamine,
pentamethylenediamine,
hexamethylenediamine,
trimethylhexamethylenediamine,
m-phenylenediamine,
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;

5-methylnonamethylenediamine;
1,4-cyclohexanediamine;
1,12-octadecanediamine;
isophorondiamine;
bis(3-aminopropyl)sulfide;
N-methyl-bis(3-aminopropyl)amine;
heptamethylenediamine;
nonamethylenediamine;
decamethylenediamine;
aminophenyl sulfones;
aminophenyl acetic acids;
4-(4-aminophenyl)butyric acids;
4-amino-1,8-naphthalic anhydride;
3-amino-2-naphthoic acid;
5-amino-isophthalic acid;
2-(2-aminoethoxy)ethanol;
4-(aminomethyl)benzoic acid;
4-(aminomethyl)cyclohexanecarboxylic acid;
amino salicylic acids;
aminobenzyl alcohol;
4-aminobutanol;
4-aminobutyric acid;
N-(4-aminobenzoyl)benzoic acid;
2-(2-aminobenzoyl)benzoic acid;
1-amino-1-cyclohexanecarboxylic acid;
4-aminocyclohexanol hydrochloride; and
mixtures of such amines.

In formula (IV), $R_4$ is generally a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures of the foregoing. Also in formula (IV), X is a leaving group capable of being displaced by a nucleophilic species, such as, for example, hydroxyl or amino. Preferably, X is a halogen, typically chlorine, or a hydroxyl group, or an alkoxy or aryloxy such as, for example, phenoxy, methoxy, or ethoxy. It is possible for formulas (III) and (IV) be connected to each other, for example, as in amino acids and derivatives of amino acids. Several illustrative examples wherein formula (III) and (IV) are present in the same compound are shown in the examples for the amine compounds. Preferred carbonyl-containing compounds include diester, diacids, and diacid dichlorides, monoacid-monoesters, and monoester monoacid-chlorides represented by the formula (V):

$$X-\overset{\overset{O}{\|}}{C}-Y-\overset{\overset{O}{\|}}{C}-X \qquad (V)$$

wherein Y is a divalent aliphatic or aromatic group containing at least 2 carbon atoms and X is as previously described for formula (IV). Illustrative carbonyl containing compounds of formula (V) include aliphatic diacids such as sebacic acid, octadecanedioic acid, suberic acid, glutaric acid, pimelic acid, and adipic acid; aromatic diacids such as the various terephthalate and isophthalate diacids and naphthalenedicarboxylate diacids; (mono)acid-(mono)esters; as well as the acid halides and lower alkyl and aryl esters of all of the foregoing aliphatic and aromatic diacids. Trifunctional or multifunctional carboxylic acids may also be incorporated to make branched structures.

In a preferred embodiment, formula (III) is a lower alkyl diamine and formula (IV) is an aromatic phthalate or naphthalenedicarboxylate derivative. Preferred diamines are dimethylenediamine, trimethylenediamine, tetramethylenediamine, pentamethylenediamine, octamethylenediamine, hexamethylenediamine, trimethyl-hexamethylenediamine. Preferred aromatic phthalate and naphthalenedicarboxylate species include terephthalic acid, isophthalic acid, and lower alkyl and aryl esters and acid halides of the foregoing and 2,6-naphthalenedicarboxylic acid as well as the corresponding lower alkyl and aryl naptholate esters and naphthalenedicarboxylate acid halides.

The ester of formula (II) is generally derived from a reaction between
(i) compounds having at least one hydroxyl group, represented by the general formula (VI):

$$HO-R_5$$

(VI) and
(ii) compounds generally represented by formula (IV) having at least one moiety having at least one carbonyl group, or a moiety capable of forming a carbonyl group, and capable of reacting with the hydroxyl compound of formula (VI) to result in an ester or ester precursor.

In formula (VI), $R_5$ is generally a $C_{1-20}$ alkylene or $C_{6-20}$ arylene group and wherein the alkylene or arylene group also contains at least one moiety selected from the group consisting of amine, hydroxyl, carboxylic acid, imido, anhydride, ester, epoxy, carboxylic acid ammonium or metal salt, or mixtures of the foregoing. As with formulas (III) and (IV), it is also possible for formulas (IV) and (VI) to be contained within the same compound. Illustrative examples include hydroxy benzoic acid; 3-hydroxybenzoic acid; 3-hydroxypicolinic acid; hydroxynicotinic acids; 4-hydroxyproline; and including caprolactone among various other lactones. The preferred hydroxy compounds include the, $C_2$–$C_{12}$ aliphatic diols, excluding $C_4$. Illustrative examples include 1,2-ethanediol, 1,6-hexanediol, 1,4-cyclohexanedimethanol, 1,2-propanediol, and 1,3-propanediol.

When the amine in formula (III) is a diamine, the amide of formula (I) can become a diamide comprising units represented by the general formula (VII):

$$R_7-\overset{\overset{O}{\|}}{C}-\underset{\underset{H}{|}}{N}-R_6-\underset{\underset{H}{|}}{N}-\overset{\overset{O}{\|}}{C}-R_7 \qquad (VII)$$

wherein $R_6$ is a $C_{1-20}$ alkylene or $C_{6-20}$ arylene group and $R_7$ is as previously defined for $R_4$ in formula (IV).

Optionally, it is possible for the diamide or mixtures of diamides to have the formula (VIII):

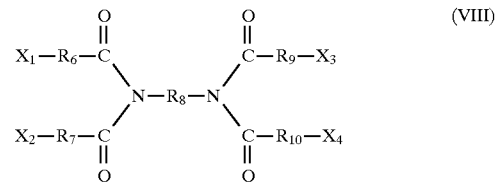

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from hydroxy, carboxylic acid, a lower alkyl or aryl ester of a carboxylic acid, epoxy, carboxylic acid ammonium salt or an anhydride, or hydrogen provided that at least one of $X_1$ or $X_2$ and $X_3$ or $X_4$ are not hydrogen.

In a preferred embodiment, the carbonyl species of formula (IV) is a bis-carbonyl species and the resultant amide of formula (I) comprises units represented by the general formula (IX):

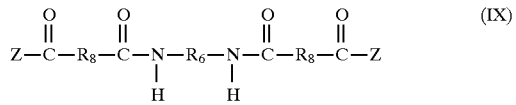

wherein Z is either a leaving group capable of being displaced by a hydroxyl or amino group or other nucleophilic species. Preferably, Z is a halogen, typically chlorine, or a hydroxyl group, or an alkoxy or aryloxy such as, for example, phenoxy, methoxy, or ethoxy. In formula (IX), $R_6$ is as previously defined in formula (VIII), and each $R_8$ independently is generally $C_{6-20}$ alkylene, or $C_{6-20}$ arylene, or mixtures of the foregoing. Preferably $R_6$ is a 1,2-ethylene or 1,4-butylene group and each $R_8$ is para-phenylene.

When Z is an alkoxy or aryloxy group in formula (IX), the resultant formula can be referred to as a "bisester diamide" (referred to as BEDA hereinafter), e.g., a bisester diamide based on terephalic acid or its derivative and dimine or its derivative.

For purposes of simplicity and future reference in the examples, in formula (IX) when Z is methoxy, $R_8$ is p-phenylene, and $R_6$ is tetramethylene, the resulting compound is abbreviated as T4T-dimethyl. Similarly, in formula (IX) when Z is methoxy, $R_8$ is p-phenylene, and $R_6$ is hexamethylene or ethylene, the resulting compounds are abbreviated as T6T-dimethyl and T2T-dimethyl, respectively.

PEA according to this invention have a substantially uniform structure and are derived from diacid derivatives, diols other than 1,4-butanediol and diamines. The preferred PEA contain the general formula (X):

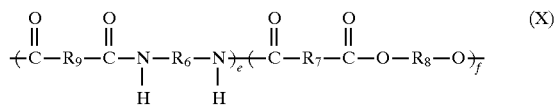

wherein $R_6$, $R_7$, $R_8$, and $R_9$ are independently $C_{1-20}$ alkylene or $C_{6-20}$ arylene, provided that $R_8$ is not butylene, and wherein e and f are each an integer greater than or equal to 1. Preferably, $R_7$ and $R_9$ are the same and are arylene, preferably a para-phenylene radical and preferably $R_6$ and $R_8$ are the same (thus s=t in Pst defined below) and are $C_2$ or $C_6$ alkylene. It is preferable for e to be 1 or a mixture of 1 and higher integers wherein the fraction of said higher integers was less than about 15%, and more preferably less than about 10%. It is also possible for e and f to each be 1, in which case the resulting polymer would be a purely alternating polyesteramide. It is also preferable for the ratio of e/f to be between about 0.05 and about 1, more preferably between about 0.05 and 0.5, and for the PEA to have an inherent viscosity [$\eta_{inh}$] exceeding 0.4 dl/g, as determined in phenol/tetrachloroethane (50:50 mol) using a 0.5% by weight solution.

In formula (X), when $R_7$ and $R_9$ are the same, preferably para-phenylene, the polymer comprising units of formula (X) can be referred to as a Pst, wherein s refers to the number of carbon atoms in $R_8$ and $R_{10}$, and t refers to the number of carbon atoms in $R_6$. For example, the PEA derived from 1,4-butanediol and tetramethylenediamine as the diol and diamine respectively would be referred to as P44 and the PEA derived from 1,2-ethanediol and tetramethylenediamine would be referred to as P24. To designate the mole percentages of diamine based on the total of diamine and diol, the mole percentage of diamine is commonly designated as Pst-%. According to this nomenclature scheme, a PEA derived from 1,2-ethanediol and 1,4-butylenediamine wherein the tetramethylenediamine is at a level of 20 mole percent, would be referred to as P24-20.

The term "uniformity" or "degree of uniformity" as it refers to the structure of the PEA indicates the molar fraction of units with e=1 relative to the sum of the units with e=1,2,3,4 . . . Units with e=1 and e=2, etc. can be discerned by NMR. So:

(Degree of) uniformity =

$$\frac{\text{(units with } e = 1\text{)}}{\text{(units with } e = 1\text{)} + \text{(units with } e = 2\text{)} + \text{(units with } e = 3\text{)} \text{ etc.}}$$

By substantially uniform structure, it is meant that the degree of uniformity is high, e.g., greater than about 70% preferably greater than 85% and most preferably grater than 90%. By having a substantially uniform structure, the PEA has surprisingly high crystallization rates. That is, Applicants have discovered that increasing the degree of uniformity on the PEA has a positive effect on the Tm and the crystallization rate of the PEA resins according to the invention.

Another surprising advantage of a highly uniform PEA is a low amino end group content in PEA originating from amide block impurities in BEDA. For that reason the number of repeat units of formula (X), i.e. units originating from diamine, which is present next to each other in the copolyester amide, is preferably not more than 15% of the overall number of repeat units of formula (X).

As mentioned above, the viscosity of the PEA, i.e. the measure for the molecular weight [$\eta_{inh}$] preferably exceeds 0.4 dl/g, and more preferably exceeds 0.6 dl/g. The viscosity has been determined in phenol/tetrachloroethane (50/50 (vol)) using a 0.5% by weight solution. These viscosities have been determined to provide a good mix of mechanical properties which are particularly desirable for the finished blend; e.g., both the elongation at break, and the impact strength are good when the viscosity exceeds about 0.4 dl/g. There is, however, no special advantage for increasing the viscosity beyond about 5.0 dl/g. Rather, when the viscosity exceeds about 5.0 dl/g, very special conditions have to be used for processing the material. Consequently, viscosities above about 5.0 dl/g are not preferred.

As a result of the high Vicat softening temperatures and increased crystallization rates, new possibilities are created for a great number of new applications. That is, PEA according to the invention constitute a class of polymers having a wide range of applications due to the rapid crystallization and extent of ordering in the solid state. The resistance to solvents is particularly good, and the water absorption is very low.

The preparation of the PEA according to the invention may be carried out in various manners. According to a first embodiment, it is done in a number of steps. A bisester diamide is prepared in a first step by reaction of a diamine with at least two-fold molar quantity of a diester of terephthalic acid, for example, dimethyl terephthalate. This reaction is generally carried out in the presence of a catalyst, for example, Li(OCH$_3$). The use of a catalyst is not necessary, but in general has a positive influence on the course of the reaction. If the reaction is carried out starting from a mixture of all components which are provided in the reactor prior to the beginning of the reaction, a rather large excess of diester (400%) should be used so as to obtain an optimum product It has surprisingly been found that it is also possible to prepare the product with a high yield using a small excess of diester (150%). It is also possible to start from the diamine and p-carboalkoxyl-benzoyl chloride.

A mixture of the diester diamide, a diol and optionally terephthalic acid, or a terephthalic acid derivative, is then condensed to form a prepolymer. This prepolymer may finally be postcondensed to form a copolyester amide having the desired properties.

The conditions for the preparation of PEA known in the literature may be used for the prepolymerization, but it is preferred to perform the prepolymerization at a temperature less than about 260° C., at a low pressure, preferably less than about 1 mm Hg bar, for at least 20 minutes and preferably at least 40 minutes. This second phase may be carried out at a temperature between about 230° C. and about 300° C., at low pressure, preferably less than about 1 mm Hg, for at least 30 minutes, and then at a temperature of less than about 230° C. at a pressure of less than about 5 bar, for 45 to 120 minutes.

The prepolymer thus obtained may optionally be postcondensed in the conventional manner in the solid state at a temperature between about 175° C. and a few degrees below the melting-point of the polymer, in the presence of an inert gas or under vacuum.

Another method of preparing the PEA according to the invention comprises adding together a diol, a diamine, and a dialkyl terephthalate or terephthalic acid or a terephthalate derivative, followed by increasing the temperature of the mixture to a value between about 150° C. and about 200° C. When the boiling temperature of the diamine is below about 150°–200° C., it is preferred to close the reactor, apply a prepressure or recycle the diamine. In this manner a prepolymer having a reasonable degree of order is obtained, which prepolymer may be postcondensed to the desired molecular weight. The advantage of this method is that it can be carried out in one reactor without intermediate isolation and/or purification steps, which may have important practical advantages.

Yet another method that may be employed involves bringing together a mixture of the diol and the diester at the indicated reaction temperature and then gradually adding the diamine. In this manner the advantage of a one-reactor method is still present, while an excellent product is obtained.

By varying the ratio of diester, diol and terephthalic acid derivative, PEA may be obtained with various ratios between ester and amide groups.

In the above description, terephthalic acid or a derivative thereof is used as a starting material for the preparation of the copolyester amide. This includes, in principle, any terephthalic acid derivative which may be used for this purpose, notably the diesters of terephthalic acid having a splittable ester group, for example, a lower alkyl group ($C_1$–$C_4$). In this regard, it is noted that it is also possible to start from a terephthalic acid other than dicarboxylic acid, for example, 2,6-naphthalene-dicarboxylic acid, provided that the dicarboxylic acid has the same or similar structural properties in the PEA according to the invention as terephthalic acid.

The invention also includes compositions containing elastomeric impact modifiers compatible with the PEA.

Impact modifiers for PEA are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may be functionalized or may not be functionalized.

Olefin polymers and copolymers employable in the invention include low density polyethylene (LDPE), high density polyethylene (HDPE), linear low density polyethylene (LLDPE), isotactic polypropylene, poly(1-butene), poly(4-methyl-1-pentene), and the like. Additional olefin copolymers include copolymers of one or more $\alpha$-olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

One type of olefinic elastomer useful in the present invention are copolymers of an $\alpha$-olefin with a glycidyl ester of an $\alpha$, $\beta$-unsaturated carboxylic acid. $\alpha$-Olefin as used herein means ethylene, propylene, butene-1, etc. Among them, ethylene is preferred. The glycidyl esters of the $\alpha,\beta$-unsaturated acids are compounds of the general formula (XI):

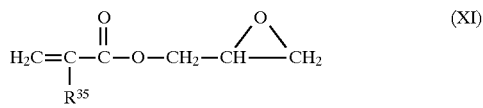

wherein $R^{35}$ represents a hydrogen atom or a lower alkyl group. Examples of the glycidyl esters of $\alpha,\beta$-unsaturated acids include glycidyl acrylate, glycidyl methacrylate and glycidyl methacrylate. The epoxy functional olefinic elastomer is preferably an olefinic copolymer containing from about 60% to about 99.5% by weight of an $\alpha$-olefin and from about 0.5% to about 40% by weight of a glycidyl ester of an $\alpha,\beta$-unsaturated carboxylic acid, preferably from about 3% to about 30% by weight; based on the weight of the elastomer's composition. When this amount is less than about 0.5% by weight, no intended effects can be obtained and when it exceeds about 40% by weight, gelation occurs during melt-blending resulting in degradation of the extrusion stability, moldability and mechanical properties of the product. Suitable epoxy functional $\alpha$-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are available from Sumitomo Chemical Co. under the trademarks IGETABOND and BONDFAST and from Elf Atochem under the trademark LOTADER.

A particularly useful class of impact modifiers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include polystyrene-polybutadiene (SBR), polystyrene-poly(ethylenepropylene) (S-EP), polystyrene-polyisoprene and poly($\alpha$-methylstyrene)-polybutadiene. Such AB block copolymers are available commercially from a number of sources, including Phillips Petroleum under the trademark SOLPRENE, from the Shell Chemical Co. under the trademark KRATON, and from Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include, e.g., polystyrene-polybutadiene-polystyrene (SBS), polystyrene-polyisoprene-polystyrene (SIS), poly($\alpha$-methyl-styrene)-polybutadiene-poly($\alpha$-methylstyrene) and poly($\alpha$-methylstyrene)-polyisoprene-poly($\alpha$-methylstyrene). Particularly preferred triblock copolymers are available commercially from Shell Chemical Co. under the trademarks CARIFLEX and KRATON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, ortho-ester, epoxy, amine, or anhydride. Many EPDM's and processes for the production thereof are disclosed in U.S. Pat. Nos. 2,933,480, 3,000,866, 3,407,158, 3,093,621 and 3,379,701, which are all incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, ortho-ester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

Also useful are the core-shell copolymers wherein an interpenetrating network of the resins employed characterizes the interface between the core and shell. Especially preferred in this regard are the ASA type copolymers available from GE Plastics under the trademark GELOY, and described in U.S. Pat. No. 3,944,631, which is incorporated herein by reference.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, silicone rubbers, thermoplastic polyester elastomers and thermoplastic poly(ether-ester) and poly(ester-amide) elastomers.

The proportion of impact modifier or other resinous material is subject to wide variation. The amount of impact modifier used is generally an amount sufficient to improve the ductility of the compositions. Impact modifiers, when utilized, are usually present in an amount up to about 20 percent by weight based on the total weight of the composition.

The addition of reinforcing fillers is also contemplated for the compositions of the present invention. Suitable reinforcing fillers are those which increase the rigidity of the blend composition. Amongst these, fibrous materials are preferred, in particular glass fibers made from low alkali E-glass, having a fiber diameter from about 8 $\mu$m to about 14 $\mu$m. The length of the glass fibers in the finished molded part is typically, for example, from about 0.01 mm to about 0.5 mm. The glass fibers may be employed as rovings or as chopped or milled glass fibers, and may be provided with a suitable finish and an adhesion promoter or promoter system based on silanes. The amount of reinforcing fillers is advantageously from about 5 weight percent to about 60 weight percent, especially from about 10 weight percent to about 40 weight percent based on the total weight of the composition.

Other fibrous reinforcing materials, e.g. carbon fibers, potassium titanate single-crystal fibers, wollastonite, gypsum fibers, aluminum oxide fibers, or asbestos may also be utilized. Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler can range from 0% to about 50% by weight based on the total weight of the entire composition.

The compositions of the present invention may also contain at least one polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XII):

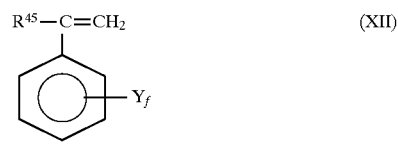
(XII)

wherein $R^{45}$ is hydrogen, lower alkyl or halogen; Y is hydrogen, vinyl, halogen or lower alkyl; and f is from 0 to 5. These resins include homopolymers of styrene, chlorostyrene and vinyltoluene, random copolymers of styrene with one or more monomers illustrated by acrylonitrile, butadiene, $\alpha$-methylstyrene, ethylvinylbenzene, divinylbenzene and maleic anhydride, and rubber-modified polystyrenes comprising blends and grafts, wherein the rubber is a polybutadiene or a rubbery copolymer of about 98–65% styrene and about 2–35% diene monomer. These rubber modified polystyrenes include high impact polystyrene (commonly referred to as HIPS). Non-elastomeric block copolymer compositions of styrene and butadiene can also be used that have linear block, radial block and tapered block copolymer architectures. They are commercially available from such companies as Fina Oil under the trademark FINACLEAR resins and from Phillips Engineering Resins under the trademark K-RESINS.

The alkenylaromatic compound when present is generally used in the range from about 1% to about 25% by weight and preferably from about 5% to about 15% by weight; based on the weight of the total composition.

The present invention also contemplates the use of effective amounts of at least one additive selected from the group consisting of flame retardants, drip retardants, dyes, pigments, colorants, stabilizers, antistatic agents, nucleating agents, plasticizers and lubricants. These additives are known in the art as are their effective levels and methods of incorporation. Effective amounts of the additives vary widely, but they are usually present in an amount from about 0.1% to 50% by weight, based on the weight of the entire composition.

All of the ingredients may be added initially to the processing system, or else certain additives may be precompounded with the polyesteramide copolymers. It appears that certain properties, such as impact strength and elongation, are sometimes enhanced by initially precompounding the polyesteramide with at least one of the typical additives identified above. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention.

EXAMPLES

Example 1

1. Poly(ethyleneterephthalate) (PET)

To a 2 l oil heated stainless steel reactor equipped with Dean-Stark trap, condenser, anchor stirrer, torque measurement, nitrogen inlet and vacuum line was added 790 g dimethylterephthalate and 788 g ethyleneglycol. The contents were heated to 175° C. and allowed to dissolve while stirring. 4.84 g zinc acetate were added and methanol started to distill off. After 15 minutes the temperature was raised at 1° C./min to 260° C. After 10 minutes at 260° C., 12.16 g triphenylphosphate and 1.61 g $Sb_2O_3$ were added. Vacuum was applied gradually to reach a pressure of <1 mBar in 15 min. Polymerization was continued for 2 hours, after which the vacuum was broken and the polymer recovered from the bottom of the reactor. The melting temperature of the polymer, determined as the peak-maximum of the second heating scan in DSC (20° C./min), was 253° C. The crystallization temperature, obtained from the consecutive cooling scan (20° C./min) was 184° C. Molecular weight, determined by GPC at 40° C. in m-cresol/chloroform (10/90), was 47000, referenced to PS-calibration standards.

2. T4T-dimethyl 88 g dimethylterephthalate, 210 ml DMF and 210 ml toluene were placed in an oil heated 1 L glass reactor equipped with Dean-Stark trap, reflux cooler, stirrer and nitrogen inlet, and were heated under nitrogen to about 140° C., 8 g 1,4-diaminobutane and 0.65 g $LiOCH_3$ were added. The solution was stirred for 4 hours at 140° C. during which a precipitate formed. The precipitate was hot-filtered, washed with hot toluene and hot methanol and was dried at about 175° C. for about 1 hour. Yield was 82%. Melting point (by DSC, 20° C./min) was 260° C. The structure was confirmed by NMR T2T-dimethyl.

3. T2T-dimethyl

The same procedure as for T4T-dimethyl, was applied with the exception that 1,4-diamino butane was replaced by 1,2-diaminoethane, and that 0.95 g $LiOCH_3$ were used. Yield was 72% and melting point 295° C.

4. T6T-dimethyl

The same procedure as for T4T-dimethyl. was applied with the exception that 1,4-diamino ethane was replaced by 1,6-diaminohexane. Yield was 79% and melting point was 234° C.

5. P22-2.5 From Preformed T2T-dimethyl

A procedure analogous to PET, was applied, starting from 790 g DMT, 41.2 g T2T-dimethyl, prepared according to the procedure for T2T-dimethyl, 441 g ethyleneglycol and 4.97 g zinc acetate. The amounts of triphenylphosphate and $Sb_2O_3$ added for the polycondensation were 12.47 and 1.65 g respectively. Polycondensation was continued till maximum torque reading (1.5 hours). The resulting polymer had a melting point of 257° C., a crystallization temperature 203° C. and a molecular weight of 66000.

6. P22-5 From in Situ Made T2T-dimethyl

A 2 l oil heated stainless steel reactor, equipped with an anchor stirrer, torque measurement, Dean-Stark trap, condensor, and nitrogen inlet was charged with 790 g DMT and 12.2 g 1,2-diaminoethane, brought under nitrogen, closed and heated to 160° C. Shortly after the mixture has become molten and transparent (visible through a glass-window) a precipitate formed. After 1 hour, the valve to the Dean-Stark trap/condensor was opened carefully and methanol was allowed to escape. 430 g ethyleneglycol and 4.84 g zinc acetate were added and the temperature was raised to 175° C. After 15 minutes the temperature was raised with 1° C./min to 260° C. After 10 minutes at 260° C., 12.16 g triphenylphosphate and 1.61 g $Sb_2O_3$ were added. Vacuum was applied gradually to reach a pressure of <1 mBar in 15 min. Polymerization was continued till maximum torque (1.5 hours), after which the vacuum was broken and the polymer recovered from the bottom of the reactor. The polymer had a melting temperature of 255° C., a crystallization temperature of 216° C. and a molecular weight of 36000. Residual amines, measured by potentiometric titration with $HClO_4$ in m-cresol at 60° C., amounted to 56 $\mu$eq/g.

7. P22-10 From in Situ Made T2T-dimethyl

A procedure analogous to P22-5 was applied, but 24.4 g 1,2-diaminoethane was added rather than the 12.2 g in the case of P22-5. The polymer had a melting temperature of 259° C., a crystallization temperature of 220° C. and a molecular weight of 31000. $HClO_4$ titratables amounted to 40 $\mu$eq/g.

8. P22-5, Amidation Following Transesterification

To a 2 l oil heated stainless steel reactor equipped with Dean-Stark trap, condensor, anchor stirrer, torque measurement, nitrogen inlet, injection port and vacuum line were added 790 g dimethylterephtalate and 505 g ethyleneglycol. The contents were heated to 175° C. and allowed to dissolve while stirring. 4.84 g zinc acetate were added and methanol started to distill off. After 1.5 hours the temperature was reduced to 150° C., the system closed and 12.2 g 1,2-diaminoethane were injected. After 1 hour the system was carefully opened again and the temperature was raised to 260° C. at a rate of 1° C./min. After 10 minutes at 260° C. 12.2 g triphenylphosphate and 1.6 g $Sb_2O_3$ were added. Vacuum was applied gradually to reach a pressure of <1 mBar in 15 min. Polymerization was continued till maximum torque reading (1.25 hours), after which the vacuum was broken and the polymer recovered from the bottom of the reactor. The polymer had a melting temperature of 254° C., a crystallization temperature of 209° C. and a molecular weight of 43000. $HClO_4$ titratables amounted to 40 μeq/g.

Example 2

P22 polymers with various amounts of diamide were prepared according to procedure for P22-2.5 from preformed T2T-dimethyl in Example 1 and compared to PET in Example 1. Properties were measured as indicated in Example 1.

TABLE 1

| Polymer  | Tm (°C.) | Tc (°C.) | Mw (GPC) | Mw (GPC)* |
|----------|----------|----------|----------|-----------|
| PET      | 253      | 184      | 44000    | 58000     |
| P22-1*   | 258      | 205      | 60000    | 80000     |
| P22-2.5* | 257      | 203      | 66000    | 89000     |
| P22-10*  | 259      | 216      | 43000    | 47000     |
| P22-15*  | 262      | 222      | 47000    | 44000     |

*postcondensation has been performed for 24 hours in nitrogen at about 240°C.

The Tm and Tc in Table 1 relate to the polymers prior to postcondensation. It can be concluded that Tm increases by incorporation of T2T into PET, and more importantly, that Tc increases even more. By this, the undercooling (Tm-Tc) required for crystallization becomes smaller. Because the undercooling is a measure for the rate of crystallization, P22's crystallize faster than PET. It can also be seen from above Table that this is not an artifact related to differences in molecular weight.

Example 3

P24 and P26 polymers with various amounts of diamide were prepared with the corresponding T4T and T6T described in Example 1. The properties for these polymers are shown in Table 2.

TABLE 2

| Polymer | Tm (°C.) | Tc (°C.) | Mw (GPC) |
|---------|----------|----------|----------|
| PET     | 253      | 184      | 44000    |
| P24-1   | 255      | 198      | 46000    |
| P24-1   | 255      | 198      | 46000    |
| P24-2.5 | 248      | 189      | 43000    |

TABLE 2-continued

| Polymer | Tm (°C.) | Tc (°C.) | Mw (GPC) |
|---------|----------|----------|----------|
| P24-10  | 236      | 167      | 69000    |
| P26-1   | 260      | 195      | 54000    |
| P26-2   | 249      | 186      | 56000    |
| P26-10  | 234      | 164      | 51000    |

The data in Table 2 also indicate a faster crystallization tendency for P24 and P26 compared to PET, but mainly at the lower diamide contents. The mismatch in chain length between diamine and diol obviously has a negative effect on both melting and crystallization temperature at higher diamide concentrations.

What is claimed is:

1. A polyesteramide resin composition having units represented by the amide formula (I):

adjacent units of the ester formula (II):

according to the following formula:

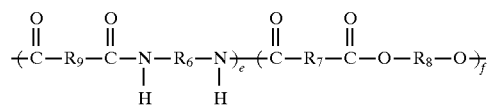

wherein $R_6$ and $R_8$ are the same and are $C_2$ or $C_6$ alkylene provided that $R_8$ is not butylene, $R_7$ and $R_9$ are the same and are a para-phenylene radical, the ratio of e/f is between about 0.05 and 0.5, said polyesteramide resin having a degree of uniformity of greater than 85 percent as determined by the following formula:

(Degree of) uniformity =

$$\frac{(\text{units with } e = 1)}{(\text{units with } e = 1) + (\text{units with } e = 2) + (\text{units with } e = 3) \text{ etc.}}$$

whereby said resin has a rapid crystallization rates.

2. A polyesteramide resin of claim 1, wherein said polyesteramide has the number of repeat units originating from diamine present next to each other less than 15% of the overall number of said diamine repeat units wherein said polyesteramide has a low amino end group content.

3. A polyesteramide resin of claim 2, wherein the viscosity of said polyesteramide exceeds 0.4 dl/g wherein said viscosity is determined in phenol/tetrachloroethane at a 50 to 50 volume ratio using a 0.5% by weight solution.

4. A polyesteramide resin of claim 3, wherein the viscosity of said polyesteramide is less than about 5.0 dl/g.

5. A polyesteramide resin of claim 3, wherein the viscosity of said polyesteramide exceeds 0.6 dl/g.

* * * * *